United States

Massa

4,011,473

Mar. 8, 1977

[54] ULTRASONIC TRANSDUCER WITH IMPROVED TRANSIENT RESPONSE AND METHOD FOR UTILIZING TRANSDUCER TO INCREASE ACCURACY OF MEASUREMENT OF AN ULTRASONIC FLOW METER

[75] Inventor: Frank Massa, Cohasset, Mass.

[73] Assignee: Fred M. Dellorfano, Jr. & Donald P. Massa, Trustees of the Stoneleigh Trust, Cohasset, Mass.

[22] Filed: Nov. 28, 1975

[21] Appl. No.: 636,054

Related U.S. Application Data

[63] Continuation-in-part of Ser. No. 500,391, Aug. 26, 1974.

[52] U.S. Cl. .................................. 310/8.2; 310/8.7
[51] Int. Cl.² ......................................... H01L 41/08
[58] Field of Search .............. 310/8.2, 8.3, 8.5, 8.7, 310/9.1, 9.4; 340/8 FT

[56] References Cited

UNITED STATES PATENTS 3,325,779  6/1967  Supernaw et al. ............... 340/8 FT
3,735,159  5/1973  Murry ............................. 310/8.2 X

*Primary Examiner*—Mark O. Budd

[57] ABSTRACT

An ultrasonic transducer employs a ceramic disc which, when excited by a d-c pulse, vibrates in its planar resonant frequency mode. The sensitivity is selectively increased for the second positive half cycle of the transient oscillation of the disc and a method is described for using the selectively improved transient response to greatly increase the precision of measurement of the time interval for a transient pulse of ultrasonic energy to travel the distance between an ultrasonic transmitter and an ultrasonic receiver.

11 Claims, 5 Drawing Figures

ULTRASONIC TRANSDUCER WITH IMPROVED TRANSIENT RESPONSE AND METHOD FOR UTILIZING TRANSDUCER TO INCREASE ACCURACY OF MEASUREMENT OF AN ULTRASONIC FLOW METER

This invention is a continuation-in-part of my copending application Ser. No. 500,391, filed Aug. 26, 1974 and is concerned with the improvement of the transient sensitivity of the transducer described therein.

The transducer described in my copending application employs a polarized ceramic disc operating in the vicinity of its planar resonant frequency mode of vibration in combination with an acoustic transformer which comprises a sound conducting elastomer material bonded to the radiating surface of the ceramic and having a thickness approximately equal to ¼ wavelength of the sound in the material at the frequency of operation of the transducer. The novel transducer design described in my copending application achieves several important advantages over the prior art including increased sensitivity and improved directional characteristics with a virtual elimination of secondary lobes in the beam pattern.

I have found the new transducer to be advantageously useful in an ultrasonic system for accurately measuring the transit time of an acoustic pulse in travelling a fixed distance between 2 transducers, one acting as a transmitter and the other as a receiver. Such an improved system, for example, may be utilized to improve the accuracy of an ultrasonic flow meter for the measurement of the velocity of a fluid even when it is moving at very low velocities. For such an application I found it possible to utilize the improved transducer disclosed herein to greatly improve the accuracy of the transit time measurement of the acoustic pulse by driving the transducer from a d-c pulse and thereby achieve an improved accuracy by more than an order of magnitude over the prior use of conventional transducers driven from a tone-burst generator. When using a tone-burst signal for driving the transmitting transducer the probable error in the measured arrival time of the tone-burst acoustic signal at the receiving transducer, even under excellent operating conditions, is of the order of 1 or 2 wavelengths of the signal frequency. In my proposed method of driving the improved transmitting transducer in accordance with the teachings of this invention I am able to reduce the error in the time measurement by 1 or 2 orders of magnitude, thereby permitting the accuracy of the ultrasonic flow meter measurements to be increased by a corresponding factor of 10 to 100 times, which means that small flow velocities can be measured with great precision.

To achieve the greatly improved accuracy of measurement, I propose to operate the inventive transducers in the transient region by driving the transmitting transducer with a d-c pulse having a steep rise time and also to modify the transducer construction, as will be described in the specification, such that the amplitude of the second positive half cycle of the oscillatory transient signal which is generated by the imposition of the d-c pulse is maximized. Further, I propose to make the arrival time meaurements of the transient acoustic signal at the instant when the value of the second positive half cycle of the transient signal exceeds the threshold recognition level of the receiver. The design modification to the transducer, which will be described in this invention, will increase the amplitude of the second positive half cycle of the oscillatory transient response without causing any increase in amplitude of the first positive half cycle of the oscillatory transient signal. Under this condition, the time of arrival of the acoustic signal will be precisely indicated within a tiny fraction of a wavelength of the oscillatory transient signal at the instant that the signal level exceeds the threshold level of the receiver which is set slightly above the peak value of the first positive half cycle of the transient oscillatory pulse. The method for achieving the greatly improved accuracy of measurement with the improved transducer design will become more evident in the disclosure which follows.

The primary object of this invention is to selectively improve the transient response sensitivity of an ultrasonic transducer when driven by a d-c pulse having a steep rise time.

Another object of this invention is to improve the precision of measurement of the time interval for a transient pulse of ultrasonic energy to travel the distance between an ultrasonic transmitter and an ultrasonic receiver.

Still another object of this invention is to design an ultrasonic transducer which includes a piezoelectric disc so that when it is excited by a d-c pulse the disc vibrates in its planar resonant frequency mode of vibration, and the acoustic energy radiated from the peripheral edge of the vibratile disc is selectively combined with the acoustic energy radiated from the plane surface of the vibratile disc so that the total acoustic radiation from the transducer is increased during the second positive half cycle of the oscillatory transient sound wave which is generated by the transducer.

The novel features which are characteristic of the invention are set forth with particularity in the appended claims. However, the invention itself, both as to its organization and method of operation, together with further objects and advantanges thereof, will best be understood by reference to the following description when taken in conjunction with the accompanying drawings in which:

Figure 2:
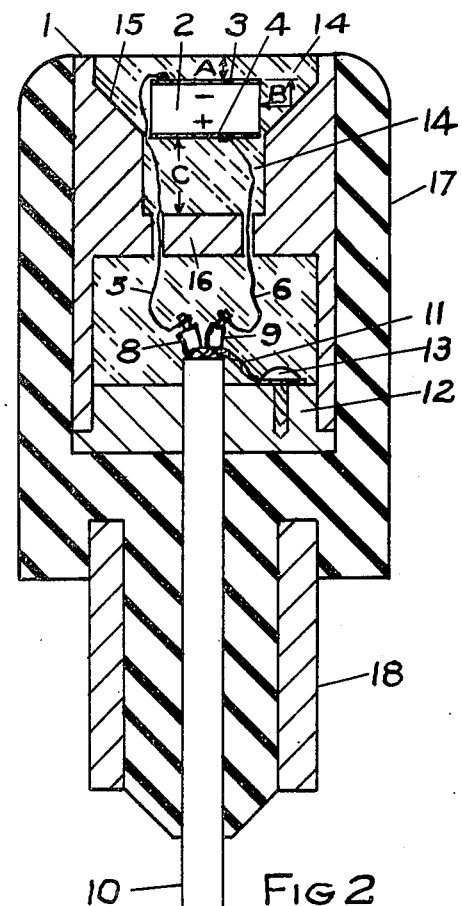
FIG. 2 is a cross sectional view taken along the line 2—2 of FIG. 1.

Referring more particularly to the figures in which one preferred form the invention is illustrated, 1 is a rigid housing which may be of any suitable material such as plastic or preferably metal when it is necessary to provide electrical shielding for the transducer assembly. A ceramic disc 2 is located along the center line of the housing and accurately held in place by any convenient structural support members associated with the housing which serve to locate the position of the disc. Details of the support members for locating the disc are not shown in the drawing as they are not relevant to this invention. Reference may be made to my copending application for a more complete description of a specific means for precisely locating the ceramic within the housing. The ceramic disc 2 may be any one of the well known polarized ceramic materials such as lead-zirconate-titanate, for example. The flat surfaces of the disc are provided with metallic electrodes 3 and 4 as is well known in the art. Insulated electrical conductors 5 and 6 are soldered to the electrode surfaces 3 and 4 as illustrated in FIG. 2 and the opposite ends of the conductors are soldered to the terminal conductors 8 and 9 in the shielded cable 10 as shown. The cable shield 11 is attached to the cap 12 by means of the drive screw 13 or by any other suitable means such as solder. The cap 12 seals the lower end of the housing 1 as illustrated in FIG. 2. To complete the transducer assembly a sound conducting material 14 is used to fill the open end of the housing to provide a height A of material in contact with surface 3 of the ceramic as illustrated in FIG. 2. The height of the acoustic coupling material A is chosen to be in the vicinity of ¼ wavelength of the sound in the material at the frequency of operation of the transducer which, for the inventive design, is preferably in the neighborhood of the planar resonant frequency mode of vibration of the disc. The advantages realized by using the acoustic coupling material 14 to act as an acoustic transformer for improving the performance of the transducer is explained in greater detail in my copending application. The advantages realized by using a ceramic disc operating in the planar resonant frequency mode of vibration for improving the response characteristic of the transducer and for improving the beam pattern by eliminating the presence of disturbing secondary lobes is also fully described in my copending application.

For the present inventive transducer the basic modification that is made to the transducer construction described in my copending application is the addition of a 45° reflecting annular surface 15 facing the peripheral edge of the ceramic disc as shown in FIG. 2. The purpose of the reflecting surface is to achieve an object of this invention which is to selectively improve the transient response sensitivity of the transducer so that its improved performance may be advantageously utilized in an ultrasonic transmission system to increase the accuracy of measurement of the transit time for an acoustic pulse to travel the distance from a transmitting transducer to a receiving transducer which, in turn, means increased accuracy for any measurement instrument employing such a system such as, for example, an ultrasonic flow meter.

Figure 1:
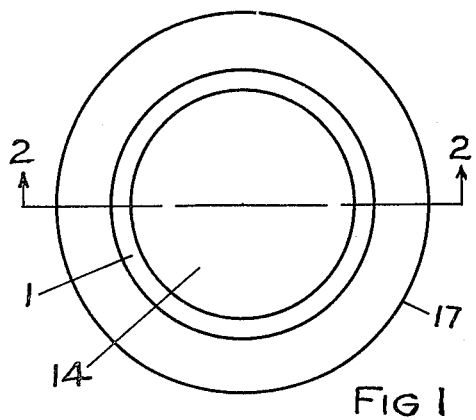
FIG. 1 is a plan view of a transducer employing the teachings of the invention.
Figure 3:
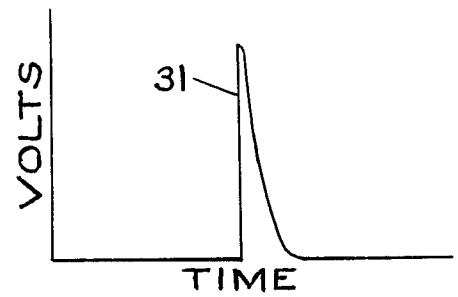
FIG. 3 is a graphical representation of a d-c pulse for driving the transducer.
Figure 4:
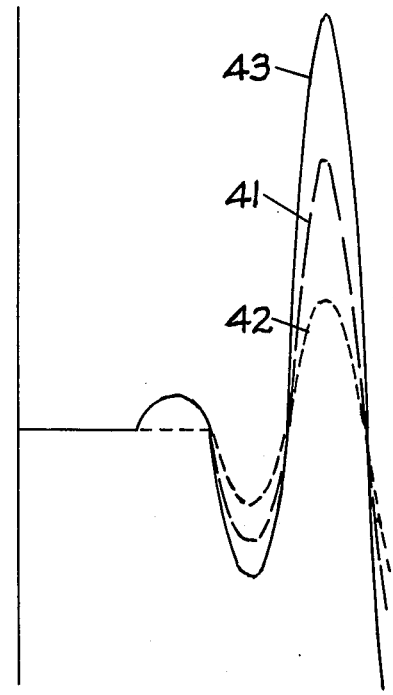
FIG. 4 is a schematic view of the transient acoustic signal generated by the transducer illustrated in FIG. 2 when excited by a d-c pulse as illustrated in FIG. 3.

When a d-c pulse having a steep rise time as illustrated by the curve 31 in FIG. 3 is applied to the ceramic disc in FIG. 2 a transient oscillatory acoustic signal will be generated as illustrated in FIG. 4. Curve 41 represents the transient acoustic output of a transducer constructed as shown in my copending application which does not include the 45° reflecting surface 15 as illustrated in FIG. 2. The frequency of oscillation of the transient signal corresponds approximately to the planar resonant frequency of the ceramic disc which, in turn, is determined by the diameter of the disc. To improve the transient performance of the transducer this invention provides a 45° reflecting surface 15 opposite the periphery of the disc as illustrated in FIG. 2 and the spacing of the reflecting surface is made such that the distance travelled by the sound from the periphery of the disc to the reflecting surface 15 plus the distance travelled from the reflecting surface to the plane containing the flat radiating surface 3 of the disc, as represented by the total path length B in FIG. 2, is equal to approximately ½ wavelength in the material 14 at the planar resonant frequency of the disc. Under such conditions the sound radiated from the periphery of the disc will be delayed ½ wavelength before being added to the radiation from the plane surface 3 of the disc. Dotted curve 42 in FIG. 4 shows the delayed output from the periphery of the ceramic which adds nothing to the amplitude of the first positive half cycle of the transient response but adds a substantial component to the second positive half cycle amplitude of the transient response. The combined transient response characteristic of the transducer employing the novel 45° reflector 15 is illustrated by the curve 43 which is the sum of curves 41 and 42. The increased amplitude of the second positive half cycle in the transient response characteristic of the inventive transducer when driven by a d-c pulse, as illustrated by curve 43, results in an improved ratio between the increased second positive half cycle amplitude and the unchanged first positive half cycle amplitude of the transient acoustic signal. This improvement in the transient response characteristic makes possible improved accuracy of measurement of the time interval for a transient pulse of ultrasonic energy to travel the distance between an ultrasonic transmitter and an ultrasonic receiver as will be described in connection with the schematic illustration shown in FIG. 5.

Referring back to FIG. 2, a solid wall section 16 is shown as part of the housing 1 and it is located at a distance C from the lower surface 4 of the disc 2. The sound conducting material 14 is also shown as filling the space C. The addition of the reflecting surface 16 opposite the ceramic surface 4 and the addition of the sound conducting material 14 in the space C is not a necessary requirement for obtaining the improved transient response characteristic previously described. These additional components may be included in the design if the transducer is to be used with a TRANSMIT-RECEIVE circuit in which a d-c pulse in the order of a kilovolt is applied to the transmitter after which the transmitter is switched to become a receiver which must respond to the arrival of an acoustic transient which will generate signal levels in the transducer of the order of a millivolt. For such a situation the kilovolt level applied across the transducer must decay to below the millivolt level by the time the acoustic signal arrives. The optional addition of the reflecting structural wall member 16 can be used to increase the rate of decay of the high voltage pulse applied across the transducer when the transducer is switched to the receive mode. The increased damping rate will be accomplished if the distance C is made approximately equal to one wavelength in the material 14 at the frequency of operation of the transducer during the initial oscillatory transient period of the acoustic signal (as represented by curve 43 in FIG. 4) after removal of the d-c pulse. For such a condition the initial wave front of acoustic energy radiated from the lower surface 4 of the ceramic disc will be reflected from the wall 16 and be returned to the lower surface of the ceramic in opposite phase to the motion of the ceramic surface at a time period 2 wavelengths after the initiation of the transient displacement of the ceramic by the application of the d-c pulse. The returned out-of-phase acoustic pulse will act to inhibit the continued free oscillation of the ceramic thereby effectively increasing the rate of damping of the ceramic. The use of this auxiliary means for increasing the rate of damping of the ceramic is only necessary for applications where the received acoustic signal arrives a relatively short time after the removal of the d-c driving pulse. For commercial models of transducers of the type described employing lead-zirconate-titanate ceramic discs in the range of a few millimeters to a few centimeters diameter and having natural planar resonant frequency modes in the ultrasonic frequency region from about 50 kHz to a few hundred kHz, experimental measurements have indicated about a 20 dB ratio between the amplitude of the second positive half cycle and the amplitude of the first positive half cycle in the transient acoustic signal (curve 43 in FIG. 4). Measurements have also shown that the use of the reflecting wall 16 is not required if the received acoustic signal arrives at the transducer later than about 1 ms after the time of application of the d-c driving pulse. For shorter intervals in arrival time the use of reflecting wall 16 to increase the ceramic damping is effective in improving the signal-to-noise measurement of the time of arrival of the ultrasonic acoustic signals.

To improve the general performance characteristic of the inventive transducer and reduce interferences from residual and spurious vibrations that could arise from natural resonant modes of the transducer housing I have found it advantageous to mold a rubber-like elastomer jacket 17 in intimate contact with the outer surface of the housing 1 as illustrated in FIG. 2. The elastomer is chosen to have the desired mechanical damping characteristic for the required operating temperature range to prevent any mechanical resonances of the housing from being established to degrade the operation of the transducer. To provide further vibration isolation for the transducer mounting, a metal sleeve 18 is molded coaxially with the housing 1 during the molding of the outer jacket 17. The metal sleeve 18 can be used as the mounting structure for the transducer and the rubber separation provided between the sleeve 18 and housing 1 serves to isolate the transducer from mechanical vibrations.

Figure 5:
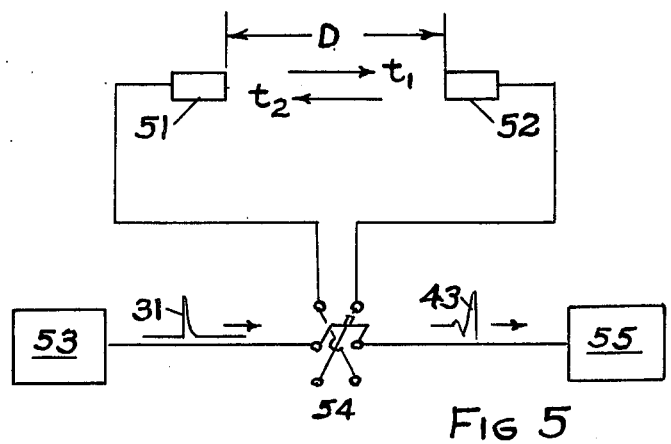
FIG. 5 illustrates a method for using a pair of the inventive transducers in an ultrasonic flow meter application for the precise measurement of fluid flow over wide ranges of fluid velocity.

FIG. 5 illustrates a method for utilizing the inventive transducer to increase the accuracy of measurement of the transit time of an ultrasonic signal to travel a fixed distance between two transducers such as may be used to improve the accuracy of measurement of the velocity of a fluid by an ultrasonic flow meter, especially when moving at very low velocities. The schematic diagram in FIG. 5 is an illustrative example of an important commercial application now being made of the improved transient response of the inventive transducer. A pair of transducers 51 and 52 are mounted in axial alignment and spaced a distance D as illustrated in FIG. 5 and the mounted structures are placed along the path where the velocity of a fluid is required to be measured. A d-c pulse generator 53 of any conventional type well known in the electronic art may be connected to either transducer 51 or 52 as schematically illustrated by the reversing switch 54. When one transducer is connected to the d-c pulse generator the other transducer is simultaneously connected to a receiving amplifier-detector 55 as illustrated by the schematic diagram. When the switch 54 is in the upper position in FIG. 5 the d-c pulse is connected to transducer 551 which generates an acoustic transient signal as illustrated by curve 43 in FIG. 4. The signal travels the distance D and arrives at the receiving transducer at a time $t_1$. The time $t_1$ is measured in the receiver 55 at the instant when the signal amplitude exceeds the level set in the threshold detector which is part of the receiver circuit 55. The threshold detection level is set slightly above the peak amplitude level of the first half cycle amplitude of the transient curve 43. When the switch 54 is reversed transducer 52 becomes the transmitter and transducer 51 becomes the receiver. The acoustic transient signal now travels from 52 and 51 and arrives at the receiver 51 at a time $t_2$ which is measured in the same manner as the former measurement of $t_1$. If the fluid medium between the transducers is at rest, $t_1$ will be exactly equal to $t_2$. If the medium is moving in the direction of the arrow $t_1$, for example, the time $t_1$ will be decreased and the time $t_2$ will be increased by an amount equal to the ratio of the fluid velocity to the velocity of sound in the medium.

A specific application will be described to illustrate the great improvement in accuracy that was achieved in a commercial ultrasonic flow meter by using the inventive transducers in the manner disclosed in the specification. Two transducers employing lead-zirconate-titanate ceramic discs having a planar resonant frequency in the vicinity of 300 kHz were spaced 20 cms apart inside an air intake manifold of an internal combustion engine designed to operate with an electronic fuel injection system in which the amount of fuel is injected into each cylinder in exact proportion to the continuously metered quantity of air which is flowing into the cylinder. With the engine stopped the velocity of the air stream is zero and the time $t_1$ is equal to the time $t_2$ in FIG. 5 which is approximately 588 $\mu$s for the 20 cm spacing (assuming the velocity of sound is 340 m/sec.) If the air stream is moving at a velocity of 1 m/sec in the direction from 51 to 52 the time $t_1$ will be decreased by $1/340 \times 588 = 1.73$ $\mu$s and the time $t_2$ will be increased by the same amount. Thus by measuring the difference $t_2-t_1$ the value $\Delta t = 3.46$ $\mu$s will represent the flow velocity of 1 m/sec. For the 300 kHz transducers employed in the system the period of 1 wavelength in the transient acoustic signal as illustrated by curve 43 in FIG. 4 corresponds to 3.33 $\mu$s. Using the threshold detector to measure the instant of arrival of the second positive half cycle of the transient signal 43, the probable error in the measurement of the time of arrival, which is the instant when the amplitude of the second positive half cycle amplitude in curve 43 exceeds the threshold level of the detector which, in turn, is set slightly above the peak amplitude of the first positive half cycle of the transient signal, was found to be within approximately 4° of the acoustic signal. The corresponding error in time amounts to $4/360 \times 3.33 = 0.037$ $\mu$s which corresponds to a velocity error of about 0.02 m/sec which is negligible for the range of air velocities encountered in the system. With a conventional ultrasonic flow meter system employing tone burst signals of 300 kHz to drive the transducers, the probable error in the measurement of the arrival time, even under the best conditions, amounts to 2 wavelengths of the acoustic signal which is 6.66 $\mu$s and corresponds to a velocity error of 3.8 m/sec which cannot be tolerated. Thus the inventive transducer with the improved transient response characteristic as disclosed and operated in the manner described reduces the error in the flow measurement by more than 100 fold thus providing a practical solution to a difficult problem which prevented the use of the conventional tone-burst operated ultrasonic system due to its unacceptable error rate for the application described.

While a specific embodiment of the present invention has been shown and described, it should be understood that various modifications and alternative constructions may be made without departing from the true spirit and scope of the invention. Therefore, the appended claims are intended to cover all such equivalent alternative constructions that fall within their true spirit and scope.

I claim:

1. An electroacoustic transducer comprising a housing structure having an opening, a piezoelectric disc having a first and second parallel plane surface and third peripheral edge surface, said disc characterized in that it may be set into vibration at a frequency in the vicinity of its planar resonant vibrational mode, means for locating side disc within said opening in said housing structure so that the first of said parallel plane surfaces is located opposite said opening and the peripheral edge surface of said disc is circumferentially spaced from the wall surface of said housing structure, an annular sound reflecting surface located within said housing and uniformly spaced about a peripheral edge surface of said piezoelectric disc, said annular reflecting surface characterized in that it is symmetrically inclined with respect to the first plane surface of said disc which is opposite said opening in said housing structure, said annular reflecting surface further characterized in that its inclined surface faces said opening in said housing structure whereby the radiation of acoustic energy from the peripheral edge surface of said disc is reflected from said annular reflecting surface and is propagated from said opening along an axial direction at right angles to said first parallel plane surface of said piezoelectric disc, a sound conducting material contained in said opening in said housing, said sound conducting material makes intimate contact with said first plane surface of said disc and with said peripheral edge surface of said disc and also with said inclined annular reflecting surface which surrounds said disc.

2. The invention in claim 1 further characterized in that the average path length distance of the sound propagated from the peripheral surface of the disc to the annular reflecting surface and continuing from the annular reflecting surface to a point lying in a plane containing said first plane surface of said disc is approximately ½ wavelength of the sound in said sound conducting material at the planar resonant frequency of said piezoelectric disc.

3. The invention in claim 2 further characterized in that the thickness of said sound conducting material measured from the first plane surface of said disc to the said exposed surface of said sound conducting material is approximately ¼ wavelength of the sound in said sound conducting material at the planar resonant vibrational mode of said disc.

4. The invention in claim 1 and a second plane reflecting surface located opposite and parallel to said second plane surface of said disc, and further characterized in that the spacing between said plane reflecting surface and said second plane surface of said disc is approximately equal to one wavelength of the sound propagated through said spacing at the planar resonant vibrational mode of said disc.

5. The invention in claim 4 further characterized in that said space between said plane reflecting surface and said disc is filled with said sound conducting material.

6. The invention in claim 3 and means for generating an oscillatory transient acoustic signal from said electroacoustic transducer said means including a d-c pulse applied to said piezoelectric disc.

7. The invention in claim 6 and means for measuring the time of arrival of said oscillatory transient acoustic signal at a point spaced along the axis of propagation of said transducer, said means including a receiving transducer, an amplifier, and a threshold detector, said threshold detector characterized in that the recognition of the transient acoustic signal occurs at the moment that the instantaneous level of the second positive half cycle of the transient signal exceeds the threshold level of the detector and further characterized in that said threshold level of the detector is set above the peak amplitude level of the first positive half cycle of said transient acoustic signal.

8. The invention in claim 3 further characterized in that said sound conducting material is an elastomer.

9. The invention in claim 5 further characterized in that said sound conducting material is an elastomer.

10. The invention in claim 7 further characterized in that said sound conducting material is an elastomer.

11. An electroacoustic transducer comprising a mounting structure having an opening, a vibratile transducer element having a vibratile surface capable of being set in motion by the application of an electrical signal to said vibratile transducer element, means for locating said vibratile surface opposite said opening, sound conducting material contained in said opening, said sound conducting material makes intimate contact with said vibratile surface, means for generating an oscillatory transient acoustic signal from said electroacoustic transducer, said means including a d-c pulse applied to said vibratile transducer element, and means for measuring the time of arrival of said oscillatory transient acoustic signal at a point spaced along the axis of propagation of said transducer, said means including a receiving transducer, an amplifier, and a threshold detector, said threshold detector characterized in that the recognition of the transient acoustic signal occurs at the moment that the instantaneous level of the second positive half cycle of the transient signal exceeds the threshold level of the detector and further characterized in that said threshold level of the detector is set above the peak amplitude level of the first positive half cycle of said transient acoustic signal.

* * * * *